US011231316B2

(12) United States Patent
Chankaya (10) Patent No.: US 11,231,316 B2
(45) Date of Patent: Jan. 25, 2022

(54) SECTIONAL OPTICAL BLOCK (71) Applicant: Lockheed Martin Corporation, Bethesda, MD (US)

(72) Inventor: Kurt M. Chankaya, Keller, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 112 days.

(21) Appl. No.: 16/703,273

(22) Filed: Dec. 4, 2019

(65) Prior Publication Data

US 2021/0172790 A1  Jun. 10, 2021

(51) Int. Cl.
*G01J 1/04* (2006.01)
*G02F 1/01* (2006.01)
*G01J 1/02* (2006.01)

(52) U.S. Cl.
CPC .......... *G01J 1/0418* (2013.01); *G02F 1/0121* (2013.01); *G01J 2001/0276* (2013.01)

(58) Field of Classification Search
CPC .................. G01J 1/0418; G01J 1/0425; G01J 2001/0276; G01J 2001/0285; G02F 1/0121

See application file for complete search history.

(56) References Cited

U.S. PATENT DOCUMENTS

| 3,714,430 A * | 1/1973 | Finvold .................... G02B 5/23 250/338.1 |
| 4,737,000 A | 4/1988 | Garlick |
| 4,852,452 A | 8/1989 | Barry |
| 6,556,336 B2 | 4/2003 | Hutcheson |
| 6,747,607 B1 | 6/2004 | Eckhardt |
| 6,785,032 B1 | 8/2004 | Le Mere |
| 7,095,026 B2 | 8/2006 | Devitt |
| 7,485,849 B2 | 2/2009 | Sonstroem |

(Continued)

FOREIGN PATENT DOCUMENTS

DE  10 2014 213 970 A1  1/2016

OTHER PUBLICATIONS

Donval, Ariela, et al., "Smart filters—Protect from Laser Threats," Laser Technology for Defense and Security X; Proc. of SPIE, vol. 9081, ©2014 SPIE; downloaded from: http://proceedings.spiedigitallibrary.org/ on Feb. 18, 2016, Terms of Use: http://spiedigitallibrary.org/ss/TermsOfUse.aspx; 7 pages.

(Continued)

*Primary Examiner* — Kevin K Pyo
(74) *Attorney, Agent, or Firm* — Baker Botts L.L.P.

(57) ABSTRACT

A system includes a first tube of a plurality of tubes, the first tube having a first end and a second end. The system further includes a light detector positioned at the second end of the first tube. The light detector is configured to detect an incoming light and determine light intensity information of the incoming light. The system further includes a material coupled to the first end of the first tube. The material is configured to change in transparency. The system further comprises a processor coupled to the light detector and the material. The processor is configured to receive the light intensity information from the light detector. The processor is further configured to determine that an intensity of the incoming light is above a threshold, and, in response to determining that the intensity is above the threshold, cause a change in transparency of the material.

20 Claims, 5 Drawing Sheets

(56) References Cited

U.S. PATENT DOCUMENTS

| | | |
|---|---|---|
| 9,835,914 B2 | 12/2017 | Clemen, Jr. |
| 10,217,875 B2 | 2/2019 | Ushinsky |
| 2004/0188617 A1 | 9/2004 | Devitt et al. |
| 2009/0207478 A1 | 8/2009 | Oron |
| 2012/0099188 A1 | 4/2012 | Akozbek |
| 2018/0088323 A1 | 3/2018 | Bao |
| 2019/0094430 A1 | 3/2019 | Lam |
| 2019/0094574 A1 | 3/2019 | Tanielian |

OTHER PUBLICATIONS

Hallberg, Tomas, et al.; "Protection of Mid-Infrared Sensors Against Laser Radiation," Preliminary Report; Swedish Defence Research Agency, Sensor Technology; FOI-R-0152-SE; ISSN 1650-1942, User Report; May 2001, 35 pages.
EPO Communication re Application No. 20206858.1-1020, European search report, dated Mar. 25, 2021.

* cited by examiner

SECTIONAL OPTICAL BLOCK

TECHNICAL FIELD

This disclosure relates in general to optical systems and more particularly to a sectional optical block.

BACKGROUND

Optical sensors are vulnerable to increasingly powerful and proliferating intense point light sources, such as lasers. For example, direct laser light may pass up an optical path and damage or jam a sensor, causing permanent or temporary blindness in part or all of the field of view. Furthermore, off-axis laser light may jam a sensor by causing lens flare in the optical train. Current techniques and tools for blocking incoming light may be limited.

SUMMARY OF THE DISCLOSURE

According to one embodiment, a system includes a first tube of a plurality of tubes, the first tube having a first end and a second end. The system further includes a light detector positioned at the second end of the first tube. The light detector is configured to detect an incoming light and determine light intensity information of the incoming light. The system further includes a material coupled to the first end of the first tube. The material is configured to change in transparency. The system further comprises a processor coupled to the light detector and the material. The processor is configured to receive the light intensity information from the light detector. The processor is further configured to determine that an intensity of the incoming light is above a threshold, and, in response to determining that the intensity is above the threshold, cause a change in transparency of the material.

According to one embodiment, a system includes a memory configured to store a threshold for an intensity of an incoming light. The system further comprises an interface. The interface is configured to receive light intensity information of the incoming light from a light detector and send a signal to a material to cause a change in transparency of the material. The system further includes one or more processors communicatively coupled to the memory and the interface. The processors are operable to receive the light intensity information. The processors are further configured to determine whether the intensity of incoming light is above the threshold, and, in response to determining that the intensity is above the threshold, generate the signal.

Technical advantages of certain embodiments may include shielding sensitive optics from incoming hazardous light while promoting efficiency by allowing vision to be maintained in an unaffected portion of the field of view. Further advantages include providing protection against all frequencies of light and against high irradiance light. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

When high intensity light passes up an optical path, it may damage or jam a sensor by causing permanent or temporary blindness. To prevent damage to optical sensors by hazardous light, a protective mechanism is needed. When protecting optical sensors from hazardous light sources, traditional means of blocking incoming light include using frequency selective filters or assemblies that block the entire field of view. Frequency filters do not have a high blockage capability. Accordingly, high irradiance or high frequency light sources may overwhelm and/or damage frequency selective filters. Furthermore, intense point light sources, such as lasers, may originate from a specific location and travel along a specific path to affect only a portion of the field of view. Although devices that block intense light by shielding the entire field of view may allow for the protection of optical sensors, they also cause a temporary, but complete, loss of vision. Accordingly, a device configured to block hazardous light while allowing vision to be maintained in unaffected portions of the visual field may be desirable.

The teachings of this disclosure recognize the use of a device to block hazardous light in one or more sectors of a visual field corresponding to the location of the incoming light. Using such device may result in various benefits, including, but not limited to, being able to protect optical sensors from hazardous light without having to temporarily blind the optical sensor. By reducing or eliminating occurrences of complete visual field interruption, efficiency may be enhanced. Furthermore, by allowing partial vision to be maintained, any risks associated with operating during periods of complete blindness would be reduced or eliminated. Additionally, such a device may be associated with benefits such as blocking incoming hazardous light at high irradiance levels and at all frequencies. The following describes systems and methods of a sectional optical block for providing these and other desired features.

Figure 1A:
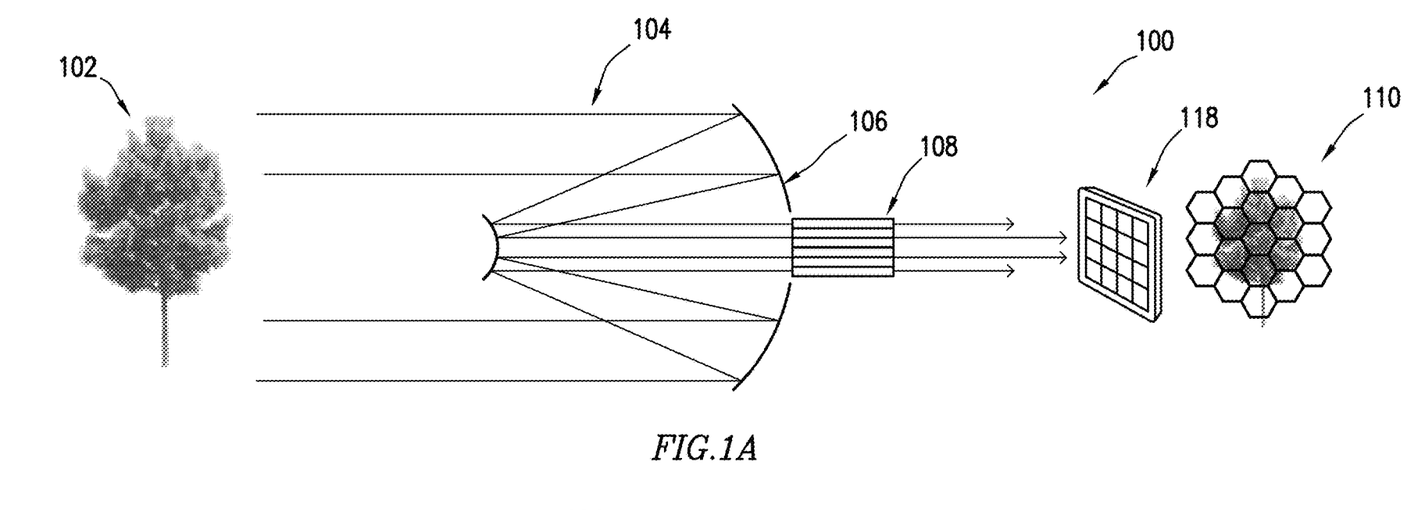
FIGS. 1A and 1B illustrate a system for blocking light in one or more sectors of a visual field, according to certain embodiments.
Figure 1B:
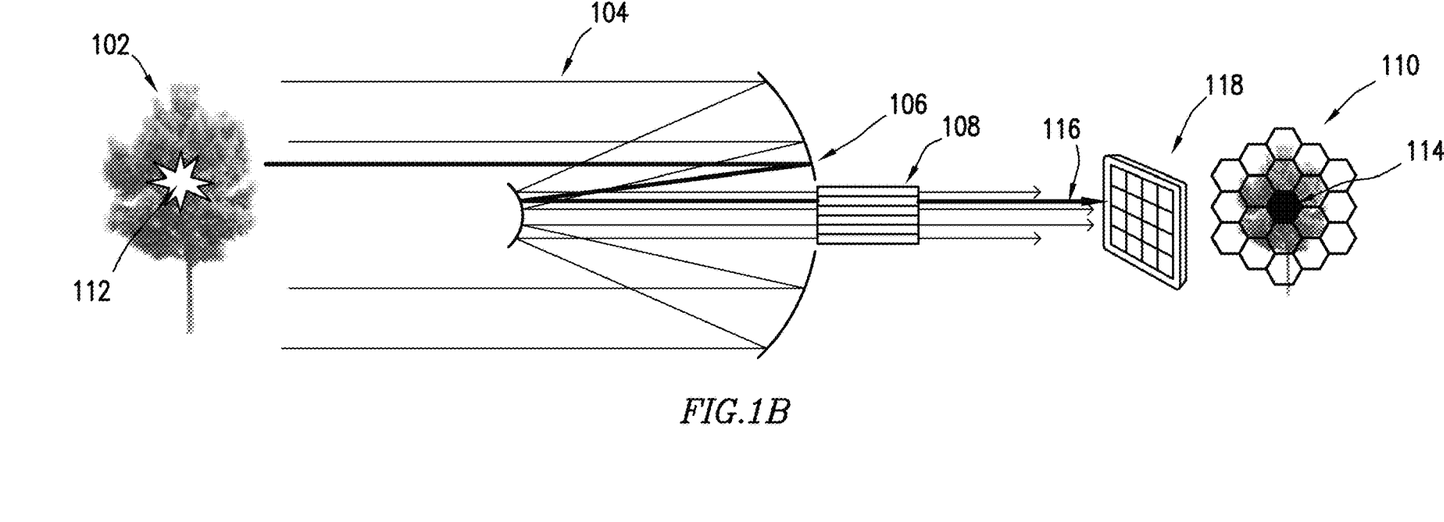

FIGS. 1A and 1B illustrate a diagram of an example system 100 for blocking hazardous light in one or more sectors of a visual field, according to certain embodiments. In certain embodiments, system 100 includes viewed scene 102, hazardous light source location 112, image light 104, hazardous light 116, optics assembly 106, plurality of tubes 108, one or more optical sensors 118, visual field 110, and blocked sector 114.

In general, system 100 involves image light 104 and, in some cases, hazardous light 116, which pass from viewed scene 102 and into plurality of tubes 108. Specifically, in response to detecting hazardous light 116, a tube or tubes within plurality of tubes 108 may be configured to block hazardous light 116 from passing to a sector 114 of visual field 110. The location of blocked sector 114 within plurality of tubes 108 and visual field 110 corresponds with the specific source location 112 of hazardous light 116 within viewed scene 102. In this way, hazardous light 116 is blocked, while the remainder of the light 104 passes through plurality of tubes 108, reaches optical sensor 118, and is visible as an image in visual field 110.

In some embodiments, viewed scene 102 may be comprised of objects or other visible features within the field of view of optical sensor 118. Viewed scene 102 may reflect and/or emit light 104 in the direction of optical sensor 118.

In some embodiments, optics assembly 106 may be comprised of one or more paraboloidal mirrors and/or lenses disposed within the path of image light 104. Optics assembly 106 may be configured to redirect image light 104 from viewed scene 102 to be directed towards optical sensor 118. The lens path of optics assembly 106 may cause light exiting optics assembly 106 to be parallel to light entering optics assembly 106. In certain embodiments, the lens path of optics assembly 106 may be converging. Optics assembly 106 may be comprised of lenses fabricated from materials including, but not limited to, silicon, glass, molded plastic, germanium, aluminum, and gold. In certain embodiments, optical system 106 may be the lens of an eye.

In some embodiments, one or more optical sensors 118 may be positioned at an end of plurality of tubes 108. Light 104 may pass through plurality of tubes 108 and reach optical sensors 118. Optical sensor 118 may convert light 104 into electrical impulses, which may be sent as output signals and processed to create an image of visual field 110. In some embodiments, optical sensor 118 may include a retina of an eye, an electro-optical sensor, an infrared camera, a laser designator, or any other suitable device, component or element capable of detecting photons and generating an electrical charge, voltage, or resistance that can be used to construct an image of the viewed scene 102. In particular embodiments, optical sensor 118 may be comprised of a detector array disposed at a focal plane, with each element of the detector array corresponding to a pixel of the resulting image. Although FIGS. 1A and 1B show an arrangement of system 100 that would correspond with using a focal plane array as optical sensor 118, system 100 may be used in connection with human eyes or any other type of suitable optical sensor, and thus the embodiment shown in FIGS. 1A and 1B should not be construed as limiting.

In some embodiments, a hazardous light 116 may pass from a specific source location 112 within viewed scene 102. Hazardous light may be any light from which system 100 is designed to protect optical sensor 118. Hazardous light may include, but is not limited to, laser light, light above or below a certain irradiance value, or light above or below a certain frequency value. Hazardous light 116 may pass from source location 112 into one or more tubes of plurality of tubes 108.

System 100 may include plurality of tubes 108, in some embodiments. Plurality of tubes 108 may be located anywhere within system 100. Plurality of tubes 108 may be coupled to one or more components of system 100 (e.g., optics assembly 106, optical sensor 118). In some embodiments, plurality of tubes 108 may be located between viewed scene 102 and optics assembly 106, while in certain embodiments, plurality of tubes may be located between optics assembly 106 and optical sensor 118. Light 104 passing through each tube within plurality of tubes 108 corresponds to a portion of the image seen in visual field 110. In some embodiments, plurality of tubes 108 may be arranged in a honeycomb arrangement, grid arrangement, triangular arrangement, or any other arrangement. In certain embodiments, the tubes may be circular, squared, triangular, octagonal, or any other shapes. Embodiments of plurality of tubes 108 are discussed further below with respect to FIG. 2.

FIG. 1A depicts an example of the operation of system 100 in the absence of hazardous light source 112 and hazardous light 116. As shown in FIG. 1A, light 104 may emit and/or reflect from viewed scene 102 and may pass unobstructed through plurality of tubes 108 to reach optical sensor 118. Optical sensor 118 may then construct a complete image of viewed scene 102 within visual field 110.

FIG. 1B depicts an example of the operation of system 100 in the presence of a hazardous light source 112 and hazardous light 116. In operation, plurality of tubes 108 may allow the assembly to detect and block incoming hazardous light 116. In some embodiments, in response to detecting hazardous light 116, one or more tubes in plurality of tubes 108 may be configured to block hazardous light 116 from passing to a sector 114 of visual field 110. The location of blocked sector 114 within the array of plurality of tubes 108, and thus within visual field 110, may correspond with the specific source location 112 of hazardous light 116 within viewed scene 102. In some embodiments, light may be blocked in additional sectors in visual field 110 if hazardous light 116 is detected in multiple tubes within plurality of tubes 108 and/or if multiple hazardous light sources are present in viewed scene 102. In some embodiments, adjacent tubes that do not detect hazardous light maintain transparency and vision for the corresponding part of the field of view. By blocking hazardous light only in affected sectors of the visual field 110, system 100 may allow vision to be maintained in the sectors of the visual field 110 that are unaffected by hazardous light 116, which increases the efficiency of optical sensor 118. Furthermore, system 100 may reduce the likelihood of problems that may be associated with a completely blinded optical sensor. The operation of system 100 is described in further detail below with respect to FIGS. 2, 3A, 3B, and 3C.

Modifications, additions, or omissions may be made to the systems described herein without departing from the scope of the invention. For example, system 100 may include any number of lenses within optics assembly 106 or tubes within plurality of tubes 108. Furthermore, system 100 may include any number of hazardous light sources 112, light 104, and optical sensors 118. The components may be integrated or separated. Moreover, the operations may be performed by more, fewer, or other components.

Figure 2:
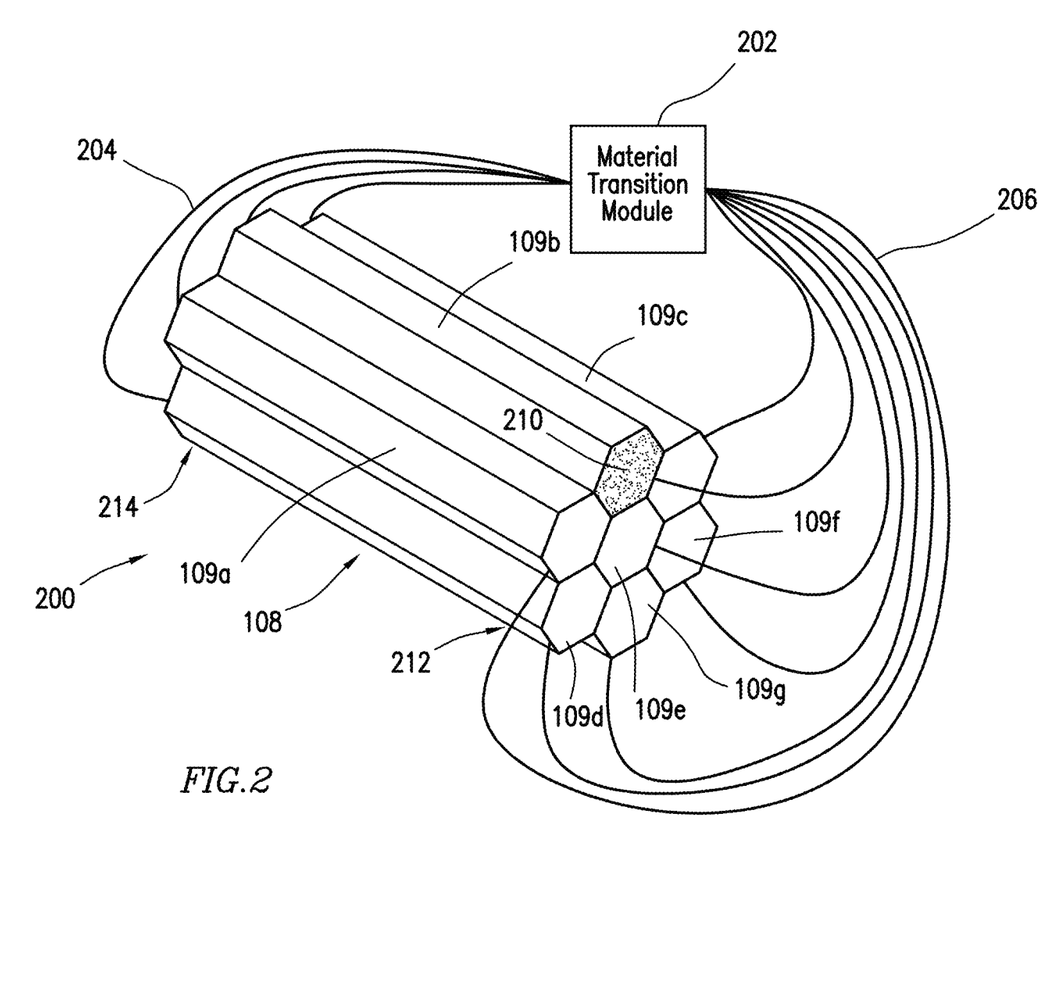
FIG. 2 illustrates an example embodiment of the system of FIGS. 1A and 1B.

FIG. 2 illustrates an example embodiment of system 100 of FIGS. 1A and 1B. As depicted in FIG. 2, assembly 200 may include plurality of tubes 108 of FIGS. 1A and 1B having first end 212 and second end 214, material 210 that may be coupled to first end 212 of each tube within plurality of tubes 108, and material transition module 202 with connectors 204 and 206.

Generally, assembly 200 may be configured to detect incoming light, determine with one or more material transition modules 202 that an intensity of the incoming light is above a threshold, and cause a change in transparency of material 210 on one or more of the tubes in plurality of tubes 108 to block the incoming light.

As described above, plurality of tubes 108 may be positioned within an optical train so that light from a viewed scene 102 passes through plurality of tubes 108 and to optical sensor 118. In some embodiments, plurality of tubes 108 may have first end 212 and second end 214. First end 212 and second end 214 may be at either end of the tube. In certain embodiments, first end 212 may be positioned proximate to viewed scene 102 and/or optics assembly 106. In some embodiments, plurality of tubes 108 may be comprised of two or more individual tubes that may be coupled together in an array. An adhesive may be used to couple the tubes, or, in some embodiments, the tubes within plurality of tubes 108 may be grouped by a mechanism surrounding the array, such as by one or more bands or any other suitable coupling mechanism. In some embodiments, plurality of tubes 108 may be comprised of an exterior housing with interior dividers that may create the individual sections. Plurality of tubes 108 may be arranged to be parallel along their lengths in some embodiments. In some embodiments, plurality of tubes 108 may be arranged in a honeycomb arrangement or in any other configuration, as described above. Furthermore, in some embodiments, plurality of tubes 108 may be arranged so that the sidewalls of adjoining tubes are in contact with one another, while in other embodiments, the tubes may be arranged such that they maintain a particular distance between each other. As an example and not by way of limitation, an array of circular tubes may have spaces between the tubes where the circular edges are not in contact with adjacent tubes. In some embodiments, the tubes within plurality of tubes 108 may have a constant inner diameter. In certain embodiments, the tubes may be configured to become narrower at the end proximal to optical sensor 118. For example, the array of tubes within plurality of tubes 108 may be arranged in a cone-like configuration. In some embodiments, plurality of tubes 108 may be sized such that system 200 may be retrofitted into existing electro-optical system optical trains. As shown in FIG. 2, the tubes comprising plurality of tubes 108 may be consistently sized. In certain embodiments, plurality of tubes 108 may be comprised of tubes of different diameters. As an example and not by way of limitation, the outermost tubes in the array may have a larger or smaller diameter than the tubes comprising the inner portion of the array. Plurality of tubes 108 may be formed from plastic (e.g., polycarbonate), metal, any suitable material, or any suitable combination thereof.

Plurality of tubes 108 may be comprised of individual tubes 109a-g. Plurality of tubes 108 may be comprised of any number of individual tubes. In some embodiments, tubes 109a-g may have thin walls, so that the walls do not cause large areas of blocked vision in visual field 110. In some embodiments, the length of first tube 109a may be greater than its width. In some embodiments, tubes 109a-g may be a hexagonally shaped tube. In certain embodiments, tubes 109a-g may be circular, squared, triangular, or octagonal, or any other shape. As described above, tubes 109a-g may have a constant inner diameter in some embodiments. In some embodiments, tubes 109a-g may be configured to become narrower at the end proximal to optical sensor 118. Tubes 109a-g may be formed from plastic (e.g., polycarbonate), metal, any suitable material, or any suitable combination thereof. Plurality of tubes 108 may be coupled to one or more material transition modules 202. Material transition module 202 may be configured to receive light intensity information indicating the detection of light in one or more tubes in plurality of tubes 108, determine if the intensity of the light is above a threshold, and send a signal to cause material 210 to change in transparency. As a nonlimiting example, material transition module 202 may be a computer such as computer 400 depicted in FIG. 4. In some embodiments, material transition module 202 may be mounted to a side of plurality of tubes 108. In certain embodiments, the material transition module 202 may be mounted in another location that may be outside of the path of incoming light, may be entirely remote, or may be mounted in any other suitable location. The operation of material transition module 202 will be described in more detail below in reference to FIGS. 3A and 3B.

In some embodiments, connectors 204 may be configured to communicatively couple material transition module 202 to one or more light detectors 304 at second end 214 of each tube within plurality of tubes 108. In some embodiments, connectors 206 may communicatively couple material transition module 202 to material 210 at first end 212 of each tube in plurality of tubes 108. Connectors 204 and 206 may be any suitable component operable to connect light detector 304 to material transition model 202 and material transition model 202 to material 210, respectively. Connectors 204 and/or 206 may allow information and/or signals to pass between components. In some embodiments, connectors 204 and/or 206 may allow signals to pass between components. For example, connectors 204 and/or 206 may facilitate the passage of electrical signals.

Material 210 may be configured to change in transparency to block hazardous light 116 upon receiving a signal from material transition module 202, in some embodiments. In some embodiments, a section of material 210 may be coupled to first end 212 of each tube (e.g., 109a-g) in plurality of tubes 108, so that it is proximate to the viewed scene. In some embodiments, material 210 may be formed of a high intensity metamaterial. In some embodiments, material 210 may change in transparency in response to a change in electric current. In some embodiments, the material 210 may become opaque or nearly opaque upon receiving a signal from the material transition module 202. The range of opacity of material 210 may be from 0% opaque to 100% opaque. In some embodiments, an application of electric current may cause material 210 to become opaque or nearly opaque. In certain embodiments, a cease in the application of electric current may cause material 210 to become opaque or nearly opaque. Material 210 may become transparent or nearly transparent upon an application of electric current, in some embodiments. In particular embodiments, material 210 may be a mechanical shutter.

As described above, assembly 200, in operation, may be configured to block hazardous light from entering one or more tubes (e.g., 109b) in plurality of tubes 108, while maintaining vision in the remainder of the tubes (e.g., 109a, 109c-g). In some embodiments, to block light, material transition module 202 causes a change in transparency of material 210 on first end 212 of one or more tubes within plurality of tubes 108. As described above, the locations of any changes in transparency of material 210 within the array of plurality of tubes 108 may correspond with the specific source location 112 of hazardous light 116 within viewed scene 102. In some embodiments, in the absence of a signal from material transition module 210 causing a change in transparency, material 210 will remain transparent or nearly transparent such that light may pass through plurality of tubes 108 and reach optical sensor 118. The operation of assembly 200 is described in further detail below with respect to FIGS. 3A, 3B, and 3C.

In operation, material transition module 202 may receive light intensity information, determine that an intensity of the incoming light is above a threshold, and send one or more signals to material 210 to cause it to change in transparency. In some embodiments, material transition module 202 may receive light intensity information. Material transition module 202 may receive the light intensity information from one or more light detectors 304 (described further below in FIG. 3A). Light intensity information may pass from light detector 304 via connector 204 to material transformation module 202. Light intensity information may pass continuously to material transition module 202 or may pass to material transition module 202 at discrete time intervals. The light intensity information may be related to irradiance level, frequency, or any other suitable means of measurement.

Figure 4:
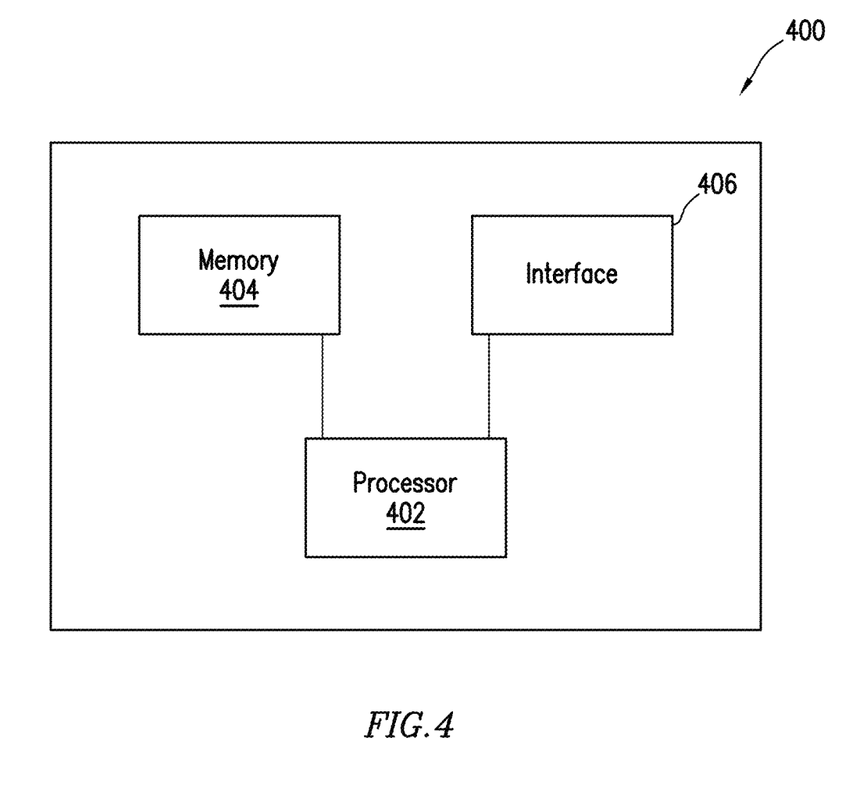
FIG. 4 illustrates a material transition module where particular embodiments of the disclosure may be implemented.

In some embodiments, material transition module 202 may determine that an intensity of the incoming light is above and/or below a threshold. In some embodiments, material transition module 202 stores a light intensity threshold value in memory 404, as shown in FIG. 4. A processor 402 within material transition module 202, as shown in FIG. 4, may compare the light intensity information with the threshold value. In some embodiments, the determination may occur as a series of multiple value comparisons over a predetermined period of time. In certain embodiments, the determination may be a single value comparison. The threshold value may be related to irradiance level, frequency, or any other value corresponding to the measurement unit of light intensity information by light detector 304. The threshold value may be a default setpoint or may be input and/or updated by a third party (e.g., manufacturer, user, or maintenance group).

In some embodiments, material transition module 202 may cause a change in transparency of material 210. Material transition module may generate one or more signals to cause a change in transparency of material 210, in certain embodiments. Signals may travel from material transition module 202 to material 210 via connector 206. In some embodiments, material transition module 202 may apply and/or cause a cease in flow of an electric current to material 210 to cause a change in transparency. Material transition module 202 may cause a change in transparency of material 210 to block incoming light in response to determining that the intensity of incoming light is above a threshold, as described above. In some embodiments, material transition module 202 may generate a signal until the intensity of incoming light is not above the threshold. Furthermore, material transition module 202 may cause a change in transparency of material 210 to allow incoming light in response to determining that the intensity of incoming light is below a threshold, in certain embodiments. In some embodiments, material transition module 202 may be operable to control the degree by which material 210 changes in transparency. Material transition module 202 may cause material to change in transparency in accordance with an amount determined by a default setpoint, or the amount of change may be input and/or updated by a third party.

Modifications, additions, or omissions may be made to the systems described herein without departing from the scope of the invention. For example, assembly 200 may include any number of tubes within plurality of tubes 108, material transition modules 202, and/or connectors 204 and 206. The components may be integrated or separated. Moreover, the operations may be performed by more, fewer, or other components.

Figure 3A:
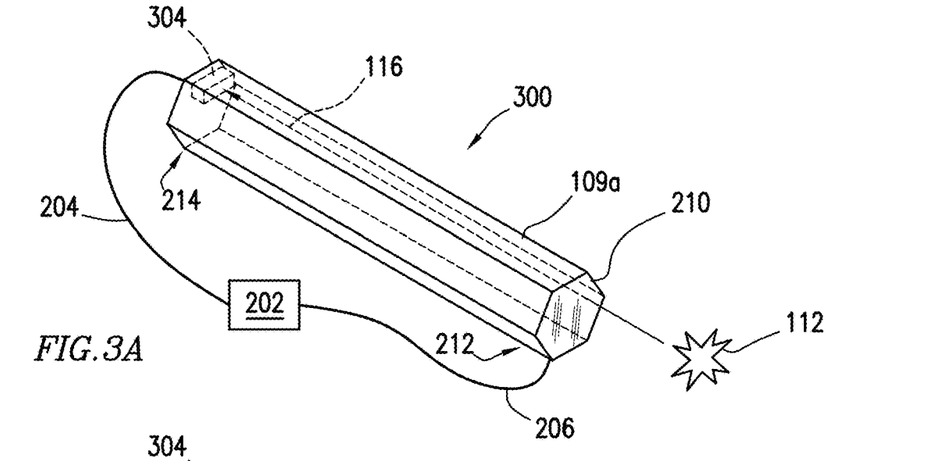
FIG. 3A illustrates a first tube and a light detector, according to certain embodiments.
Figure 3B:
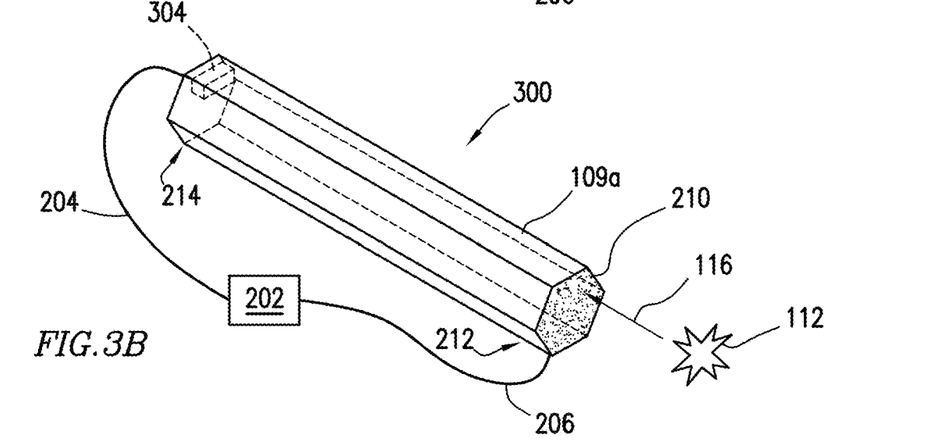
FIG. 3B illustrates a first tube and a material blocking direct light, according to certain embodiments.
Figure 3C:
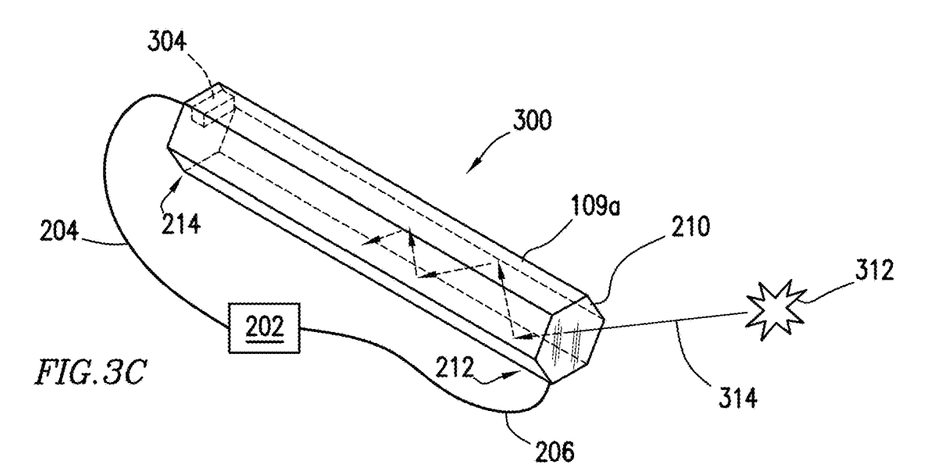
FIG. 3C illustrates an indirect light entering a first tube, according to certain embodiments.

FIGS. 3A, 3B, and 3C illustrate views of a first tube 109a, a light detector 304 detecting direct light, a material 210 blocking direct light, and indirect light 314 entering first tube 109a, according to certain embodiments. In general, assembly 300 may comprise first tube 109a, one or more light detectors 304 configured to detect light and send a signal to one or more material transition modules 202 of FIG. 2, which determine whether the intensity of the light is above a threshold and, if above the threshold, cause a change in the transparency of material 210 of FIG. 2 on first end 212 of first tube 109a.

FIG. 3A illustrates an embodiment of a first tube 109a and a light detector 304. In some embodiments, first tube 109a comprises first end 212 and second end 214. In some embodiments, material 210 may be coupled to first end 212, and first end 212 may be positioned proximate to viewed scene 102 and/or optics assembly 106. Second end 214 of first tube 109a may be positioned proximate to optical sensor 118 in some embodiments. The interior surface of first tube 109a may be configured to prevent indirect light from reaching second end 214 of first tube 109a. As an example and not by way of limitation, the interior surface of first tube 109a may be covered in a light-absorbing material that may be operable to cause indirect light entering the first tube to dissipate as it reflects off of the interior walls. In certain embodiments, the sidewalls of first tube 109a may be covered in dark paint, such as black paint, or a flat black optically absorptive material. In certain embodiments, a material on the interior of first tube 109a may reflect indirect light back towards first end 212 of the tube. For example, first tube 109a may be lined with microscopic ridged mirrors. In some embodiments, these mirrors may be reflective triangles that may be positioned so that the hypotenuse of the triangle faces second end 214 of the tube. The mirrors may operate to reflect light back outside of first end 212 of the tube in a single reflection. The operation of the interior surface of first tube 109a will be further described below in reference to FIG. 3C.

In some embodiments, light detector 304 is positioned at second end 214 of first tube 109a. Light detector 304 may be positioned to sense light entering first tube 109a from first end 212. In some embodiments, light detector 304 may be coupled to the interior sidewall of first tube 109a by any suitable means of connection. In certain embodiments, light detector 304 may be positioned on a detector of a focal plane array or other array on which each detector location corresponds to a specific tube. In some embodiments, light detector 304 may be a photo cell or a sensor configured to detect certain frequencies, irradiance levels, or other measures of light intensity. Light detector 304 may be configured to sense light including, but not limited to, laser light, visible light, and infrared light.

In operation, first tube 109a may be configured to block hazardous light that travels parallel to the length of the tube. FIG. 3A illustrates that in some embodiments, hazardous light source location 112 may emit hazardous light 116 that may enter the tube through first end 212, pass through the tube to second end 214, and contact light detector 304. In some embodiments, light detector 304 may detect the light based on the means of measurement that it is programmed to detect. Light detector 304 may determine light intensity information of incoming light in some embodiments. Light intensity information may pass from light detector 304 via connector 204 to material transformation module 202. In some embodiments, material transformation module 202 will receive the light intensity information and determine whether the intensity of the incoming light 116 is above the light intensity threshold. In some embodiments, if the light intensity threshold is exceeded, material transition module 202 may generate a signal and may send the signal via connector 206 to material 210.

FIG. 3B illustrates a first tube 109a and a material 210 blocking direct light, according to certain embodiments. As described above, in some embodiments, if the light intensity threshold is exceeded, material transition module 202 may generate a signal and may send the signal via connector 206 to material 210. In certain embodiments, material 210 may become opaque or nearly opaque and may cause hazardous light 116 to be blocked from entering first tube 109*a*.

FIG. 3C illustrates a view of an indirect light entering first tube 109*a*, according to certain embodiments. Generally, first tube 109*a* is configured to prevent indirect light from reaching second end 214. In some embodiments, indirect light may be off-axis light, and may include light that causes lens flare.

In operation, the interior of first tube 109*a* may be configured to absorb or reflect incoming indirect light 314 from indirect light source 312 so that it does not reach light detector 304 at second end 214 of the tube, as explained above. In certain embodiments, the length of first tube 109*a* may be dependent on the ability of the interior of first tube 109*a* to dissipate or redirect incoming indirect light 314.

Modifications, additions, or omissions may be made to the systems described herein without departing from the scope of the invention. For example, assembly 300 may include any number of light detectors 304, material transition modules 202, and/or connectors 204 and 206. The components may be integrated or separated. Moreover, the operations may be performed by more, fewer, or other components.

FIG. 4 illustrates an example of a computer system. According to certain embodiments of the present disclosure, material transition module 202 of FIG. 2 may be or comprise computer system 400. Computer system 400 may comprise one or more interfaces 406, memory 404, and one or more processors 402. Although this disclosure describes and illustrates a particular computer system 400 having a particular number of particular components in a particular arrangement, this disclosure contemplates the computer system 400 having any suitable number of any suitable components in any suitable arrangement.

Interface 406 may comprise hardware and/or software. Interface 406 receives input (e.g., sensor data or system data), sends output (e.g., instructions), processes the input and/or output, and/or performs other suitable operation. As an example, interface 406 receives information from light detector 304 of FIGS. 3A, 3B, and 3C, such as frequency, irradiance, or other data about the intensity of the light sensed by the light detector. In some embodiments, interface 406 receives a generated signal from processor 402 and sends the signal to a material 210 to cause a change in transparency of the material. Interface 406 may include one or more interfaces 406, where appropriate. Although this disclosure describes and illustrates a particular interface, this disclosure contemplates any suitable interface.

Memory (or memory unit) 404 may store information. As an example, a memory may store a light intensity threshold value. Memory 620 may comprise one or more non-transitory, tangible, computer-readable, and/or computer-executable storage media. Examples of memory 404 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, processor 402 may be communicatively coupled to one or more components of system 400, including memory 404 and interface 406. Processor 402 may include any suitable combination of hardware and software implemented in one or more modules to execute instructions and manipulate data to perform some or all of the described functions of material transition module 202. In some embodiments, processor 402 may include, for example, one or more computers, one or more central processing units (CPUs), one or more microprocessors, one or more applications, one or more application specific integrated circuits (ASICs), one or more field programmable gate arrays (FPGAs), and/or other logic. As an example, processor 402 may determine whether the intensity of an incoming light is above a threshold.

In operation, system 400 may receive light intensity information and send one or more signals to material 210 to cause material 210 to change in transparency. In some embodiments, system 400 may be communicatively coupled to one or more light detectors 304 and to material 210 by way of connectors 204 and 206, respectively.

In some embodiments, processor 402 may receive light intensity information. Processor 402 may receive the light intensity information from interface 406, which may receive the light intensity information from one or more light detectors 304. The light intensity information may be comprised of an irradiance value, frequency value, or any other suitable means of measurement.

In some embodiments, processor 402 may determine that an intensity of the incoming light is above and/or below a threshold. Processor 402 may compare the light intensity information received from interface 406 with a value stored in memory 404. The threshold value may be related to irradiance level, frequency, or any other value corresponding to the measurement unit of light intensity information.

In some embodiments, processor 402 may cause a change in transparency of material 210. In certain embodiments, processor 402 may generate one or more signals to cause a change in the transparency of material 210 and may cause interface 406 to send the signal to material 210 via connector 206. The signal may be an electric current. In some embodiments, processor 402 may cause an application and/or a cease in flow of an electric current to material 210 to cause a change in transparency. In some embodiments, processor 402 may be operable to control the degree by which material 210 changes in transparency. Processor 402 may cause a change in transparency of material 210 in response to determining that the intensity of incoming light is above a threshold, in some embodiments. In some embodiments, processor 402 may generate a signal until the intensity of incoming light is not above the threshold. Furthermore, processor 402 may cause a change in transparency of material 210 to allow incoming light in response to determining that the intensity of incoming light is below a threshold, in certain embodiments.

In some embodiments, processor 402 may determine whether material 210 is configured to block incoming light. In certain embodiments, processor 402 may query material 210 to determine whether material 210 is configured to block incoming light. Processor 402 may test material 210 to determine whether it is opaque or nearly opaque. In some embodiments, to determine whether material 210 is configured to block incoming light, processor 402 may query interface 406 to determine if interface 406 is sending a first signal to material 210 to cause a change in the transparency of the material.

The components of computer system 400 may be integrated or separated. The operations of computer system 400 may be performed by more, fewer, or other components. Additionally, operations of material transition module 202 may be performed using any suitable logic that may comprise software, hardware, other logic, or any suitable combination of the preceding.

Modifications, additions, or omissions may be made to the systems described herein without departing from the scope of the invention. For example, system 400 may include any number of processors 402, memory units 404, and/or interfaces 406. The components may be integrated or separated. Moreover, the operations may be performed by more, fewer, or other components.

Figure 5:
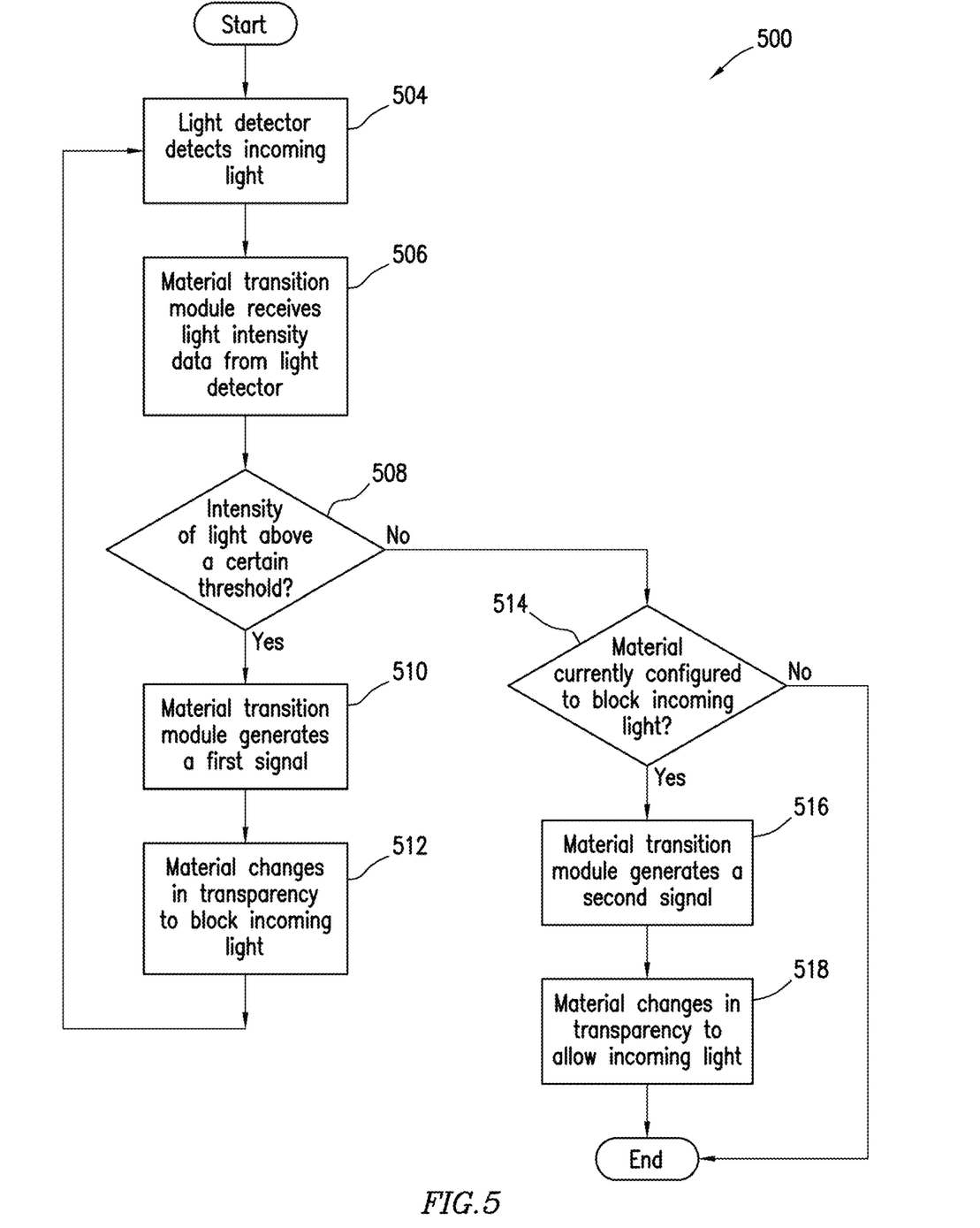
FIG. 5 is a flow chart illustrating a method for blocking light in one or more sectors of a visual field with the system of FIG. 1, according to certain embodiments.

FIG. 5 is a flowchart illustrating a method 500 for blocking hazardous light in one or more sectors of a visual field with example system 100 of FIG. 1, according to certain embodiments.

The method begins at step 504, in some embodiments, during which light detector 304 detects an incoming light. As an example and not by way of limitation, light detector 304 may be a photo cell or a sensor designed for certain frequencies or irradiance levels. The incoming light may be a visible light beam, laser beam, infrared light, or any other form of light that light detector 304 is designed to detect.

At step 506, in some embodiments, material transition module 202 receives light intensity information from light detector 304. The light intensity information may be related to irradiance level, frequency, or any other suitable means of measurement.

At step 508, in some embodiments, material transition module 202 determines whether the measure of light intensity as communicated by the light intensity information in step 506 exceeds a threshold. In some embodiments, material transition module 202 stores a light intensity threshold value. In some embodiments, material transition module 202 stores a light intensity threshold value in memory 404, as shown in FIG. 4. The threshold value may be related to irradiance level, frequency, or any other value corresponding to the measurement unit of light intensity information by light detector 304. The threshold value may be a default setpoint included in system 100 or may be input and/or updated by a third party (e.g., manufacturer, user, or maintenance group). If at step 508 material transition module 202 determines that the intensity of light is above a threshold, the method continues to step 510. If at step 508 material transition module 202 determines that the intensity of light is not above a threshold, the method continues to step 514.

At step 510, in some embodiments, material transition module 202 generates a first signal. In some embodiments, material transition module 202 generates a first signal with a processor 402 that is communicatively coupled to a memory 404 and an interface 406, as shown in FIG. 4. In some embodiments, material transition module 202 sends a first signal to a material 210 with interface 406, as shown in FIG. 4. In some embodiments, the first signal may be an electric current.

At step 512, in some embodiments, the material 210 changes in transparency to block the incoming light. Upon the completion of step 512, steps 504 through 512 may be repeated over a period of time until the material transition module 202 determines that the intensity of light is not above a threshold. If at step 508 the material transition module 202 determines that the intensity of light is not above a threshold, the method continues to step 514.

At step 514, in some embodiments, the material transition module 202 determines whether material 210 is configured to block incoming light. If at step 514 the material transition module 202 determines that the material 210 is configured to block incoming light, the method continues to step 510. If material transition module 202 determines that the material 210 is not currently configured to block incoming light, the method ends. If at step 514 the material transition module 202 determines that the material 210 is currently configured to block incoming light, the method continues to step 516.

At step 516, in some embodiments, material transition module 202 generates a second signal. In some embodiments, material transition module 202 generates a second signal with a processor 402 that is communicatively coupled to a memory 404 and an interface 406, as shown in FIG. 4. In some embodiments, material transition module 202 sends a second signal to a material 210 with interface 406, as shown in FIG. 4. The second signal may cause material 210 to change in transparency to allow incoming light. In some embodiments, the second signal may be an electric current.

At step 518, in some embodiments, material 210 changes in transparency to allow incoming light. In some embodiments, material 210 may become transparent or nearly transparent when it receives the second signal from material transition module 202. After this, the method ends.

Modifications, additions, or omissions may be made to method 500 described herein without departing from the scope of the invention. For example, the steps may be combined, modified, or deleted where appropriate, and additional steps may be added. Additionally, the steps may be performed in any suitable order without departing from the scope of the present disclosure. While discussed as various components of system 100 performing the steps, any suitable component or combination of components of system 100 may perform one or more steps of the method.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A system, comprising:
   a first tube of a plurality of tubes, wherein the first tube comprises a first end and a second end;
   a light detector positioned at the second end of the first tube, the light detector configured to:
   detect an incoming light; and
   determine light intensity information of the incoming light;

a material coupled to the first end of the first tube, the material configured to change in transparency;

a processor coupled to the light detector and the material, and configured to:
  receive the light intensity information from the light detector;
  determine that an intensity of the incoming light is above a threshold; and
  in response to determining that the intensity is above the threshold, cause a change in transparency of the material.

2. The system of claim 1, wherein an interior surface of the first tube is configured to prevent indirect light from reaching the second end.

3. The system of claim 1, wherein the interior surface of the first tube is configured to absorb light.

4. The system of claim 1, wherein the plurality of tubes is arranged to be adjacent along their lengths.

5. The system of claim 1, wherein the first tube is hexagonally shaped.

6. The system of claim 1, wherein the first tube has a constant inner diameter.

7. The system of claim 1, wherein an electric current causes the change in transparency of the material.

8. The system of claim 1, wherein the material changes in transparency when exposed to an electric current.

9. The system of claim 1, wherein the second end of the first tube is positioned proximate to an electro-optical sensor.

10. A system comprising:
  a memory configured to store a threshold for an intensity of an incoming light;
  an interface configured to:
    receive light intensity information of the incoming light from a light detector, the light detector positioned at a second end of a first tube of a plurality of tubes; and
    send a signal to a material to cause a change in transparency of the material, the material coupled to a first end of the first tube;
  one or more processors communicatively coupled to the memory and the interface, the processors operable to:
    receive the light intensity information;
    determine whether the intensity of incoming light is above the threshold; and
    in response to determining that the intensity is above the threshold, generate the signal.

11. The system of claim 10, wherein the signal is an electric current.

12. The system of claim 10, wherein the signal causes the material to change in transparency in the absence of an electric current.

13. The system of claim 10, wherein the light intensity information comprises a frequency value.

14. The system of claim 10, wherein the light intensity information comprises an irradiance value.

15. The system of claim 10, wherein the one or more processors are further operable to determine whether the material is configured to block incoming light.

16. The system of claim 10, wherein the one or more processors are further operable to control the degree by which the material changes in transparency.

17. The system of claim 10, wherein the one or more processors are operable to determine whether the intensity of incoming light is below the threshold.

18. The system of claim 10, wherein the interface is configured cause the material to change in transparency to allow incoming light when the intensity is below the threshold.

19. The system of claim 10, wherein the threshold comprises a value that corresponds to the measurement unit of the light intensity information.

20. The system of claim 10, wherein the one or more processors generate
  the signal until the intensity of incoming light is not above the threshold.

* * * * *